(12) United States Patent
Sumi et al.

(10) Patent No.: US 8,124,208 B2
(45) Date of Patent: Feb. 28, 2012

(54) MULTI-LAYER TUBE

(75) Inventors: Takehiko Sumi, Kanagawa (JP);
Tetuaki Eguchi, Kanagawa (JP);
Daisuke Yamazaki, Kanagawa (JP)

(73) Assignee: Kyoraku Co., Ltd., Kyoto (JP)

( * ) Notice: Subject to any disclaimer, the term of this patent is extended or adjusted under 35 U.S.C. 154(b) by 322 days.

(21) Appl. No.: 12/385,789

(22) Filed: Apr. 20, 2009

(65) Prior Publication Data
US 2009/0288728 A1 Nov. 26, 2009

Related U.S. Application Data

(63) Continuation-in-part of application No. PCT/JP2006/320974, filed on Oct. 20, 2006.

(51) Int. Cl.
*B32B 1/08* (2006.01)
*B32B 27/08* (2006.01)
*B32B 27/28* (2006.01)
*B32B 27/32* (2006.01)
*B32B 27/38* (2006.01)
*F16L 11/00* (2006.01)
*F16L 9/14* (2006.01)

(52) U.S. Cl. .............. 428/36.91; 428/36.6; 428/36.7; 428/36.8; 428/36.9; 138/137; 138/141

(58) Field of Classification Search .............. 428/34.1, 428/34.4, 34.6, 34.7, 35.7–36.2, 36.4, 36.6, 428/36.7, 36.8, 36.9, 36.91; 138/118, 137–139, 138/140–143
See application file for complete search history.

(56) References Cited

U.S. PATENT DOCUMENTS

| | | | |
|---|---|---|---|
| 5,139,878 A | 8/1992 | Kim et al. | |
| 5,570,711 A | 11/1996 | Walsh | |
| 5,662,972 A | 9/1997 | Shimada et al. | |
| 6,823,898 B1 * | 11/2004 | Nie et al. | 138/137 |
| 2005/0155662 A1 | 7/2005 | Nie | |
| 2009/0053443 A1 | 2/2009 | Kitahara et al. | |

FOREIGN PATENT DOCUMENTS

| | | |
|---|---|---|
| JP | 03-114829 A | 5/1991 |
| JP | 5-318553 A | 12/1993 |
| JP | 06-504742 T | 6/1994 |
| JP | 09-131833 A | 5/1997 |
| JP | 09-509626 T | 9/1997 |
| JP | 2000-043286 A | 2/2000 |
| JP | 2003-080724 A | 3/2003 |
| JP | 2006-513051 T | 4/2006 |
| WO | WO 2006/095857 A1 | 9/2006 |

* cited by examiner

OTHER PUBLICATIONS

"Fluorine Jushi no Bussei Ichiranhyo," Asahi Kasei Amidasu Kabushiki Kaisha "Plastics" Henshubu, Plastic Data Book, first edition, Dec. 1, 1999, p. 719.

*Primary Examiner* — Walter B Aughenbaugh
(74) *Attorney, Agent, or Firm* — Jacobson Holman PLLC

(57) ABSTRACT

A multi-layer tube containing: (1) a barrier layer made of laminated fluoro resin, and (2) at least one outer layer. The barrier layer has a thickness no greater than 20% of the average thickness of the multi-layer tube, and consists of a homo polymer of chlorotrifluoroethylene having a melting point no greater than 220° C., a melt flow rate (MFR) between 0.1 and 10 g/10min at a temperature of 230° C., and a tensile modulus between 750 and 1500 MPa. The outer layer consists of a styrene elastomer. Optionally, an oxygen barrier layer is included between the outer layer and the barrier layer. The barrier layer and the outer layer are integrally laminated with each other by forming the barrier layer and the outer layer in a co-extrusion manner with an adhesive resin being interposed between the barrier layer and the outer layer.

12 Claims, 2 Drawing Sheets

MULTI-LAYER TUBE

This application is a continuation-in-part of International Patent Application No. PCT/JP2006/320974, filed Oct. 20, 2006 in Japan and designating the United States, the disclosure of which is hereby incorporated by reference.

TECHNICAL FIELD

The present invention relates to a multi-layer tube of thermoplastic resin exhibiting barrier capacity, flexibility, transparency, kink resistance and chemical resistance especially used to transport and supply various types of liquids, which multi-layer tube realizes high steam barrier performance and excels co-extrusion forming performance. The multi-layer tube of the present invention comprises at least a flexible elastomer layer, a fluoro resin layer excelling in steam barrier performance and chemical stability and an adhesive resin layer disposed for bonding each layers. This multi-layer tube can find application in medical use including fluid infusion or blood transfusion tubes, use in automobile including cleaning liquid or fuel liquid tubes and use in machine instruments including ink supply tubes of printer units provided in printer, various measuring equipments and observation equipments, etc.

BACKGROUND OF THE INVENTION

Conventionally, soft plastic such as polyvinyl chloride, polyethylene, etc. has been adopted as thermoplastic resin constituting a tube. However, a fluoro resin has been adopted in view of improving the barrier capacity and the chemical resistance (refer to Japanese Patent Laid-open Publications 2000-43286, HEI09-131833, and 2003-80724, for instance). The fluoro resin has a good barrier capacity and a good chemical resistance, in particular, a high steam barrier performance and a relatively high oxygen barrier performance, however, it is difficult to produce a flexible tube, since it is generally rigid and has a high melting point. Such being the case, the steam barrier performance is worsened in a case where the flexibility of the tube is sought, while on the other hand, the flexibility of the tube is worsened in a case where the steam barrier performance is sought. This means that there is a technical problem of incompatibility between the steam barrier performance and the flexibility of the tube.

Japanese Patent Laid-open Publication 2000-43286 discloses a tube suitable for an ink supply tube of an ink jet printer comprising PCTFE copolymer as a fluoro component which is formed by the copolymerization of a fluoro resin with a soft component and a thermoplastic resin such as ECTFE (ethylene-chlorotrifluoroethylene) to exhibit a low extension coefficient.

However, in a case where the copolymer of the fluoro resin is used, it is necessary to increase the thickness of the barrier resin layer in order to obtain a tube including a desired barrier capacity, since the barrier capacity of the resin itself is decreased. This causes a technical problem of a decrease of the transparency and the kink resistance, since it is not possible to set an outer diameter of the tube itself to be small.

In addition, each of the Japanese Patent Laid-open Publications HEI09-131833 and 2003-80724 discloses a multi-layer tube constituted by laminating a fluoro resin layer, and a soft rubber or an elastomer layer. This multi-layer tube was attempted to be applied to a wide range of technical fields by laminating a fluoro resin layer which includes a good steam barrier performance and a chemical stability, and the soft rubber or the elastomer layer, however, there is a technical disadvantage that this tube is not suitable for co-extrusion forming because of a low adhesiveness between these two resins. Various improvements have been made to solve this disadvantage.

The Japanese Patent Laid-open Publication HEI09-131833 discloses a multi-layer tube which comprises a thermoplastic elastomer (a1), a fluoro resin (b1) and an intermediate adhesive layer between the thermoplastic elastomer (a1) and the fluoro resin (b1) which is constituted by a polymer alloy in which a thermoplastic polymer including adhesive properties to the elastomer layer and a resin including fluorine having adhesive properties to the fluoro resin layer are dispersed in such a way that the thermoplastic polymer and the resin constitute a sea-island pattern, and which multi-layer tube is produced by forming the thermoplastic elastomer (a1), the fluoro resin (b1) and the intermediate adhesive layer in a co-extrusion manner.

However, although the adhesive properties can be improved by adopting such polymer alloy, this tube has a poor transparency, since fluoro resin is dispersed in the thermoplastic polymer, and since it is necessary to adjust an amount of the resin constituting the adhesive layer, in view of attaining the desired flexibility and kink resistance of this tube, this tube has an unstableness in that its adhesive strength can be varied even by a slight difference of the ratio of components of this tube.

The Japanese Patent Laid-open Publication 2003-80724 discloses an ink tube consisting of tetrafluoroethylene-hexafluoropropylene copolymer (FEP) resin layer and a silicon rubber layer. However, the fluoro resin consisting of FEP has a high melting point so that it is technically difficult to form this tube with an elastomer in a co-extrusion manner, and since FEP has a poor adhesive properties with the silicon rubber layer, it is necessary to treat a surface of FEP in order to laminate it with the silicon rubber layer, etc.

SUMMARY OF THE INVENTION

After the inventor has made an effort to solve the above technical problems, the inventor found out that the above technical problems can be solved by the fact that the multiple tube is produced by forming a certain fluoro resin and an elastomer in a co-extrusion manner to integrally laminate them.

The first feature of the present invention is that a fluoro resin constituting a barrier layer of a multilayer tube is a homopolymer or copolymer of chlorotrifluoroethylene a melting point of which is lower than 220° C., a melt flow rate (MFR) of which is 0.01 to 10 g/10 min at 230° C., and a flexural modulus of which is 1200~1800 MPa measured at 23° C. in accordance with ASTM D790. In this connection, a tensile modulus is preferably 750~1500 MPa. Preferably, the homopolymer will have an MFR of 0.1 to 10 g/10 min at 230° C.

Particularly preferred fluoropolymer include homopolymers and copolymers of polychlorotrifluoroethylene (PCTFE) and copolymer of ethylene-chlorotrifluoroethylene (ECTFE). As used herein, copolymers include polymers having two or more monomer components. Such copolymers may contain up to 10%, and preferably up to 8% by weight of other comonomers, such as vinylidene fluoride and tetrafluoroethylene.

Since a water vapor transmission rate of the homopolymer or copolymer of chlorotrifluoroethylene at 40° C.-90% (RH) is lower than or equal to 1 g·mm/m$^2$·day, the homopolymer or copolymer of chlorotrifluoroethylene has so extremely high steam barrier capacity that it is possible to prevent a liquid in the tube from being evaporated, and, in particular, to prevent water from being diffused. In addition, since the transparency of the homopolymer or copolymer of chlorotrifluoroethylene is higher than that of other fluoro resin and its melting point is lower than that of other fluoro resin, it is advantageous to form the multi-layer tube in a co-extrusion manner with other thermoplastic resin layers. In particular, it is preferable to set the difference between the melting point of the homopolymer or copolymer of chlorotrifluoroethylene and that of other thermoplastic resin to be lower than 100° C., since if this condition is not fulfilled, the multi-layer tube formed by the co-extrusion manner causes a deformation or some layer causes waviness.

In the homopolymer or copolymer of chlorotrifluoroethylene constituting the barrier layer of the multi-layer tube of the present invention, its melt flow rate (MFR) is 0.01~10 g/10 min and its flexural modulus is 1200~1800 MPa. In this connection, a tensile modulus is preferably 750~1500 MPa. If MFR is low, it is difficult to form the multi-layer tube in the co-extrusion manner. The co-extrusion forming performance can be improved by setting MFR of the thermoplastic resin constituting each layers to be close to each other. Further, the flexural modulus of the homopolymer or copolymer of chlorotrifluoroethylene is preferably 1200~1800 MPa, in view of the fact that the steam barrier capacity is maintained, while at the same time, the flexibility and the kink resistance are improved. If the flexural or tensile modulus of the homopolymer or copolymer of chlorotrifluoroethylene departs from such a numerical range, the flexibility and the kink resistance of the multi-layer tube are worsened.

Still further, in the homopolymer or copolymer of chlorotrifluoroethylene constituting the barrier layer of the multi-layer tube of the present invention, its surface tension is preferably high than or equal to 30 dyne/cm. Since fluoro resin has low surface energy and a small solubility parameter, in general, it has low adhesive properties with other resins constituting other layers. Thus, if the surface tension is lower than 30 dyne/cm, the adhesive properties of the barrier layer with the layer adjacent to the barrier layer get worsened.

The second feature of the present invention is that a ratio of the thickness of the barrier layer with the average thickness of the multi-layer tube is lower than, or equal to 20%, preferably 15%, and that the average thickness of the barrier layer is thinner than, or equal to 100 μm, preferably 50 μm. This causes the steam barrier capacity of the multi-layer tube to be maintained, while causing its flexibility and the kink resistance to be improved.

Still more further, the third feature of the present invention is that an outer layer consisting of a styrene elastomer a tensile modulus of which is 7 to 40 MPa and a tensile yield strength of which is 0.5 to 5 MPa is provided outside of at least the barrier layer. Since in the multi-layer tube of the present invention, its ratio of the thickness of the layer constituted by the above styrene elastomer is between 50% and 90%, an extremely high kink resistance can be obtained.

The most inner layer of the multi-layer tube may be the barrier layer so long as the layer constituted by the styrene elastomer is provided at least outside of the barrier layer. However, it is preferable that the thickness of the barrier layer be as thin as possible, in view of the flexibility of the multi-layer tube. Such being the case, as compared with the barrier layer as the most inner layer, in a case where the barrier layer is disposed to be an intermediate layer by providing a layer constituted by the styrene elastomer inside of the barrier layer without exposing the barrier layer as the most inner layer, it is possible to further stabilize the forming properties in the co-extrusion manner and the steam barrier capacity.

In the multi-layer tube of the present invention, a minimum radius upon the generation of the kink can be lower than, or equal to 20 mm by the above layer structure. In case of the tube whose kink resistance is bad, a folded line in a mountainous pattern can be caused on an inner side of the bent portion when the tube is bent. The tube is bent in a dog-leg manner upon the generation of the kink, so that the flow passage inside the tube can be closed, whereby the tube cannot be functioned so as to transport, or supply the liquid. Such being the case, it is necessary to make the minimum radius upon the generation of the kink small in a case where the tube for supplying the liquid is used in a bent manner, or the tube is applied to a case where a stress is applied to the tube from outside.

Still more further, the fourth feature of the present invention is that an oxygen barrier layer is provided outside of the barrier layer. The oxygen barrier layer comprises a ethylene-vinyl alcohol copolymer the oxygen transmission rate at 20° C.-65% RH of which is equal to, or lower than 1.5 cc·20 μm/m²·day·atm. The ethylene-vinyl alcohol copolymer has a high gas barrier capacity, while it is known that such a high gas barrier capacity is decreased by water. This means that in a case where this oxygen barrier layer is used for the tube for supplying liquid, the oxygen barrier capacity is worsened by steam from inside the tube. For this reason, in the multi-layer tube of the present invention, the oxygen barrier layer is disposed to be outside of the barrier layer consisting of the homopolymer or copolymer of chlorotrifluoroethylene including a high steam barrier capacity. This causes the tube for supplying the liquid to maintain both a high steam barrier capacity and a high oxygen barrier capacity, whereby the change of properties of the liquid in the tuber can be preferably prevented.

Still more further, the fifth feature of the present invention is that each layers constituting the multi-layer tube is integrally laminated with each other by forming them in a co-extrusion manner via an adhesive resin layer mainly comprising acid modified polyethylene. This causes the forming in the co-extrusion manner to be realized, while at the same time causing the adhesive strength to be improved.

EFFECT OF THE PRESENT INVENTION

According to the present invention, a steam evaporation of a various types of liquid to be transported or supplied can be prevented, and a transformation of said liquid to be stored can be prevented for a long time by blocking the transmission of oxygen from outside, and thus, a multi-layer tube which has a good flexibility, a good kink resistance, a good durability against the repeated folding and bending, and a high reliability can be provided.

EXPLANATION OF THE REFERENCE NUMBERS

Figure 1:
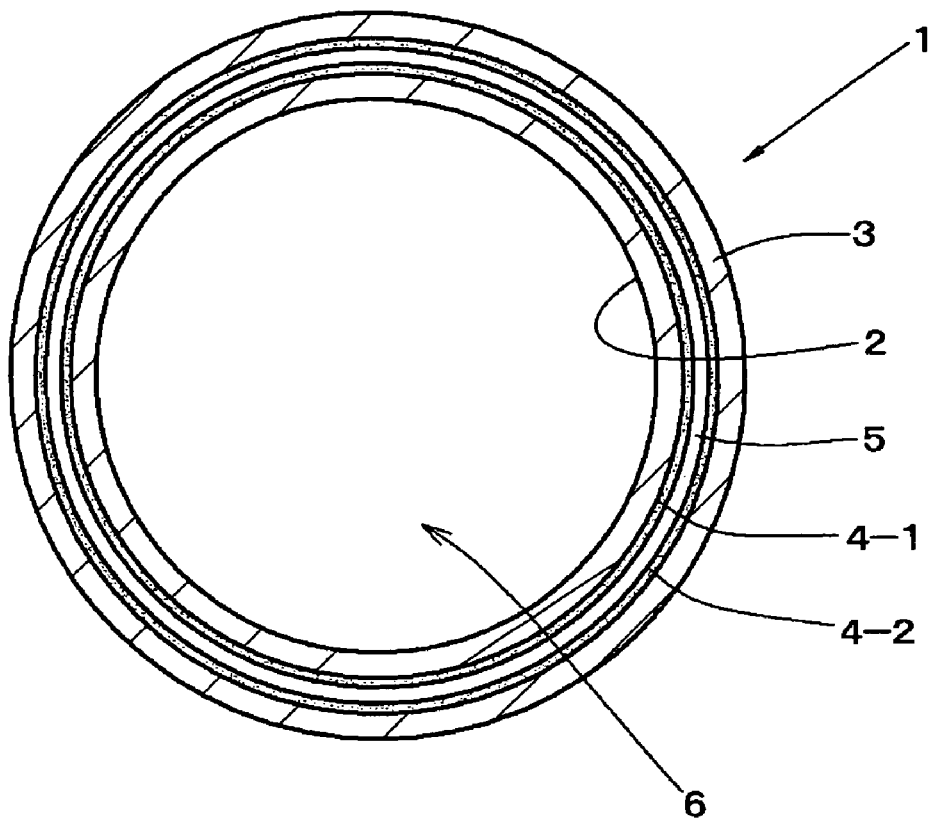
FIG. 1 is an enlarged cross sectional view showing one configuration of the multi-layer tube of the present invention.

1: multi-layer tube
2: inner layer
3: outer layer
4-1: adhesive resin layer
4-2: adhesive resin layer 4-3: adhesive resin layer
5: barrier layer
6: liquid supply passage
7: oxygen barrier layer

DETAILED DESCRIPTION OF EMBODIMENTS OF THE INVENTION

In order to describe the present invention in detail, the present invention will be explained with reference to the drawings.

In FIG. 1, the reference number 1 indicates a multi-layer tube. The multi-layer tube 1 includes a five-layer structure comprising an inner layer 2, an outer layer 3, a barrier layer 5, and adhesive resin layers 4-1, 4-2. The reference number 6 indicates a liquid supply passage. The thickness of the inner layer 2, the adhesive resin layer 4-1, the barrier layer 5, the adhesive resin layer 4-2, and the outer layer 3 is preferably 100~300 μm, 5~50 μm, 5~100 μm, 5~50 μm and 200~600 μm, respectively. In this connection, the thickness of each of these layers is not limited to the above range.

Figure 2:
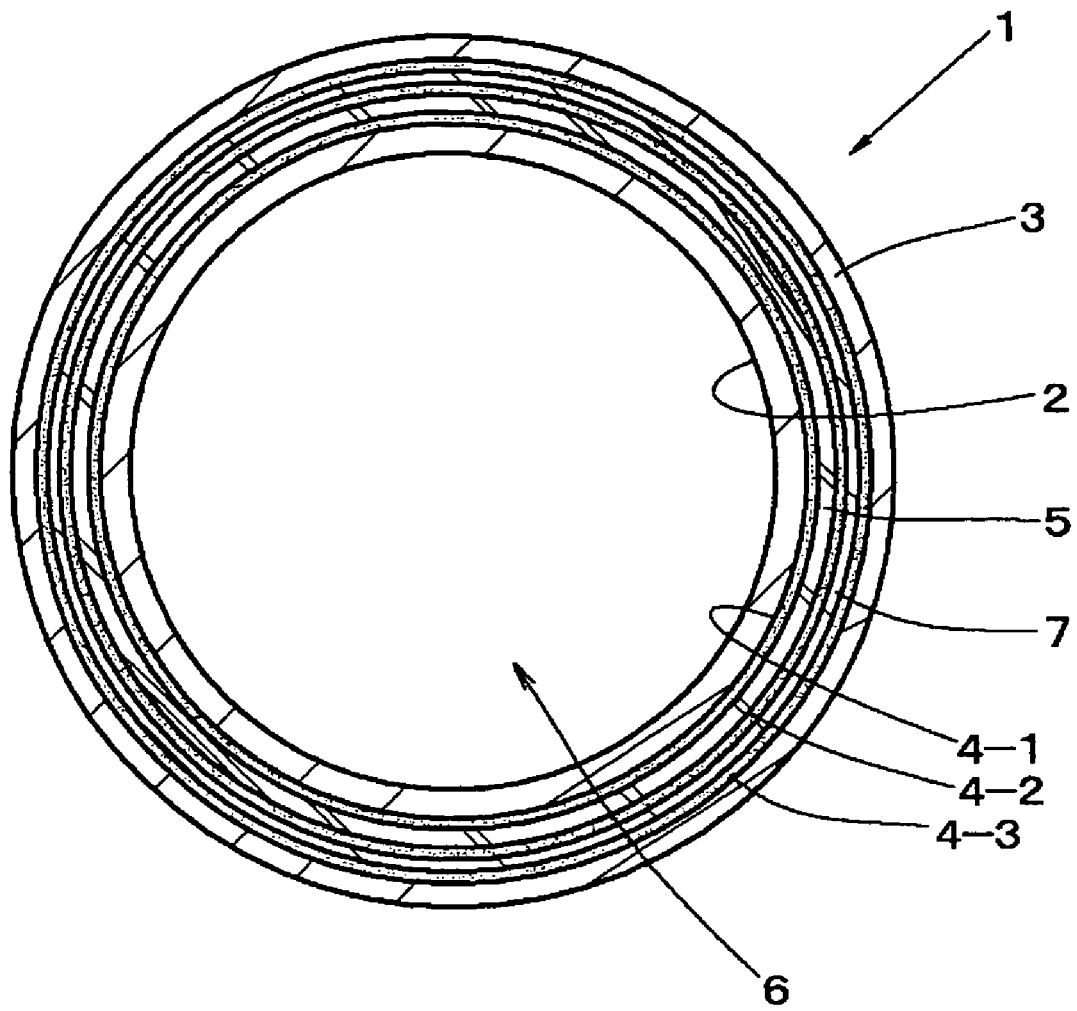
FIG. 2 is an enlarged cross sectional view showing another configuration of the multi-layer tube of the present invention.

In FIG. 2, the reference number 1 indicates a multi-layer tube. The multi-layer tube 1 includes a seven-layer structure comprising an inner layer 2, an outer layer 3, a barrier layer 5, an oxygen barrier layer 7, adhesive resin layers 4-1, 4-2 and 4-3. The reference number 6 indicates a liquid supply passage. The thickness of the inner layer 2, the adhesive resin layer 4-1, the barrier layer 5, the adhesive resin layer 4-2, the oxygen barrier layer 7, the adhesive resin layer 4-3, and the outer layer 3 is preferably 100~300 μm, 5~50 μm, 5~100 μm, 5~50 μm, 5~100 μm, 3~25 μm and 200~600 μm, respectively. In this connection, the thickness of each of these layers is not limited to the above range.

The multi-layer tube of the present invention may be a configuration (not shown) in which the barrier layer is disposed to be an innermost layer to be exposed to the liquid in the tube without providing the inner layer and the adhesive resin layer interposed between the inner layer and the barrier layer. The chemical resistance of the multi-layer tube can be improved by disposing the barrier layer consisting of a homopolymer of chlorotrifluoroethylene to be the innermost layer.

The following multi-layer structures may be preferably adopted as a layer structure for the multi-layer tube of the present invention:

Three-layer structure: a barrier layer/an adhesive resin layer/an outer layer;
Five-layer structure: a barrier layer/an adhesive resin layer/oxygen barrier layer/an adhesive resin layer/an outer layer, or inner layer/an adhesive resin layer/a barrier layer/an adhesive resin layer/an outer layer; and
Seven-layer structure: an inner layer/an adhesive resin layer/a barrier layer/an adhesive resin layer/an oxygen barrier layer/an adhesive resin layer/an outer layer.

In the present invention, the barrier layer 5 may consists of a homopolymer or copolymer of chlorotrifluoroethylene as outlined above. The homopolymer of chlorotrifluoroethylene is a homopolymer of chlorotrifluoroethylene (CTFE) exhibiting good steam and oxygen barrier performances. The barrier layer 5 with a thickness of 50 μm includes the water vapor transmission rate equal to, or less than 1 g·mm/m²·day at 40° C.-90% R H, 0.5 g·mm/m²·day, more preferably, while it includes the oxygen transmission equal to, or less than 50 cc/m²·day·atm at 25° C.—dry condition.

The homopolymer of chlorotrifluoroethylene, the melting point of which is lower than 220° C. may be used, in view of forming a multi-layer tube in a co-extrusion manner. In addition, the homopolymer of chlorotrifluoroethylene of the present invention has a melt flow rate (MFR) of between 0.1 and 10 g/min at 230° C. and a tensile modulus of between 750 and 1500 MPa. The MFR was measured at a weight of 2.16 kgf in accordance with JIS K7210. Further, the tensile modulus was measured at 23° C. in accordance with JIS K7113.

The barrier layer 5 consists of the homopolymer of chlorotrifluoroethylene, however, other resin which is compatible with the homopolymer of chlorotrifluoroethylene may be added so long as it does not deteriorate the steam barrier performance of the barrier layer 5. For instance, fluoro resin such as a chlorotrifluoroethylene-vinylidene fluoride copolymer, a ethylene-vinylidene fluoride copolymer, or ethylene-chlorotrifluoroethylene copolymer, all of which copolymer is constituted by chlorotrifluoroethylene or vinylidene fluoride.

In the present invention, a saponified copolymer of ethylene and vinyl acetate (a ethylene-vinyl alcohol copolymer) including ethylene content of equal to, or less than 45 mol % and a saponification degree of equal to, or more than 96% may be preferably used as an oxygen barrier layer 7. The oxygen barrier layer 7 with a thickness of 50 μm includes the oxygen transmission rate equal to, or less than 0.5 cc/m²·day·atm at 20° C.-65% RH.

Further, an elastomer component may be blended with the saponified copolymer of ethylene and vinyl acetate in order to improve the flexibility and the characteristics at a low temperature, so long as the oxygen barrier performance of the oxygen barrier layer is not deteriorated. An olefin elastomer, a styrene elastomer, an ester elastomer, and a modified polyolefin resin, etc. may be used. In particular, the ester elastomer such as a polyester-polyether block copolymer which is constituted by the bonding of polyester hard segment with a high melting point with polyether soft segment in a blocked manner may be preferably used. In addition, As modified polyolefin resin, polyolefin a partial or all of which is graft modified by unsaturated carboxylic acid or its derivative, a ethylene-unsaturated carboxylic acid (or its ester) copolymer, ionomer, a saponified copolymer of ethylene and vinyl acetate with a ethylene content of equal to, or more than 50 mol % or its partial saponified material, and a ethylene-vinyl acetate copolymer may be used.

In the present invention, the outer layer 3 consists of a styrene elastomer. In the styrene elastomer, in view of the flexibility and the kink resistance of the multi-layer tube, the tensile modulus is 7~40 MPa and the tensile yield strength is 0.5~5 MPa. The styrene elastomer may preferably be a styrene-butadiene block copolymer, a styrene-butadiene-styrene block copolymer, a styrene-ethylene-butylene-styrene block copolymer, a styrene-ethylene-propylene-styrene block copolymer, a styrene-isoprene block copolymer, a styrene-isoprene-styrene block copolymer, a mixture of any of the above copolymers, and any of the above copolymers to which hydrogen is added. Liquid paraffin may be adopted as an additive, in view of improving flexibility. In particular, the styrene elastomer mainly comprising a styrene-ethylene-propylene-styrene block copolymer, or a styrene-ethylene-propylene-styrene block copolymer may be preferable.

In the present invention, the inner layer 2 consists of at least one kind of resin selected from a group of a olefin elastomer, a styrene elastomer, low density polyethylene, straight chain low density polyethylene, ultra low density polyethylene, straight chain ultra low density polyethylene, and a mixture thereof. Brittleness temperature of these resin is lower than, or equal to −30° C. In addition, in the present invention, a ethylene-propylene copolymer rubber, a ethylene-butane copolymer rubber, a propylene-butane copolymer rubber, a butadiene-styrene copolymer rubber to which hydrogen is added may be preferably used as an olefin elastomer, and a styrene-butadiene block copolymer, a styrene-butadiene-styrene block copolymer, a styrene-ethylene-butylene-styrene block copolymer, a styrene-isoprene block copolymer, a styrene-isoprene-styrene block copolymer, and any of these block copolymers to which hydrogen is added may be preferably used as a styrene elastomer.

In the present invention, the adhesive resin layer 4 mainly comprises acid modified polyethylene. The acid modified polyethylene may preferably be the resin mainly comprising maleic anhydride acid modified polyethylene, in particular. However, in a case where the tube is bent by a stress from outside, each laminated layers tend to be debonded by a repeated folding and bending, and there is a technical disadvantage that fluoro resin has non-surface tack, in general, so that it has a low adhesive properties with other resins. Such being the case, if the adhesive resin layer 4 consists of acid modified polyethylene only, its adhesive properties are so low that the debonding between adjacent layers can be gradually caused when a stress is applied from outside, whereby the performance of the multi-layer tube gets worsened. Therefore, it is preferable that a mixture of acid modified or epoxidized olefin resin in which a styrene elastomer such as SEBS rubber is contained with acid modified polyethylene constituting a main resin be used as a resin constituting the adhesive resin layer.

In addition, in a case where the barrier layer and the oxygen barrier layer are integrally laminated with each other via the adhesive resin layer, it is preferable that the average thickness of the barrier layer constituted by a homopolymer of chlorotrifluoroethylene and that of the oxygen barrier layer constituted by a ethylene-vinyl alcohol copolymer be set to be thinner than, or equal to 100 μm, more preferably 50 μm, respectively, in view of the flexibility of the multi-layer tube. Further, since the ethylene-vinyl alcohol copolymer lacks the flexibility, it is possible to improve the steam barrier capacity and the oxygen barrier capacity, while at the same time to maintain a good flexibility by laminating the oxygen barrier layer so as to set its thickness to be thinner than that of the barrier layer.

Embodiments

Next, the embodiment of the present invention will be described. In the embodiment, a multi-layer tube 1 has an outer diameter of 3.0 mm, an inner diameter of 2.0 mm, and a thickness of 500 μm. The multi-layer tube constituted by the following layers was produced and evaluated.

With respect to the steam barrier capacity, the multi-layer tube with the length of 1.0 m was filled with water and both ends thereof were closely sealed, and then, the water vapor transmission rate of the multi-layer tube was measured after its weight has changed due to the fact that it was stored for a week at a temperature of 40° C. (an ambient temperature). It was evaluated to be excellent, good, acceptable, and bad in a case where the water vapor transmission rate (g·mm/m$^2$·day) was less than, or equal to 0.3, less than, or equal to 0.5, less than, or equal to 1.0, and more than 1.0, respectively.

With respect to the kink resistance, the minimum radius upon the generation of the kink was measured by bending the tube. It was evaluated to be excellent, good, acceptable, and bad in a case where the minimum radius (mm) was less than, or equal to 15, less than, or equal to 20, less than, or equal to 25, and more than 25, respectively.

INDUSTRIAL APPLICABILITY

The present invention relates to a multi-layer tube of thermoplastic resin exhibiting barrier capacity, flexibility, transparency, kink resistance and chemical resistance especially used to transport and supply various types of liquids, which multi-layer tube realizes high steam barrier performance and excels co-extrusion forming performance. This multi-layer tube can find application in medical use including fluid infusion or blood transfusion tubes, use in automobile including cleaning liquid or fuel liquid tubes and use in machine instruments including ink supply tubes of printer units provided in printer, various measuring equipments and observation equipments, etc.

EXAMPLES

Embodiment 1

The multi-layer tube of the following five-layer structure was produced.

The inner layer 2: a styrene elastomer (100 μm)/the adhesive resin layer 4-1: the adhesive resin (25 μm)/the barrier layer 5: homopolymer of chlorotrifluoroethylene (50 μm)/the adhesive resin layer 4-2: the adhesive resin (25 μm)/the outer layer 3: a styrene elastomer (300 μm)

The resin mainly comprising a styrene-ethylene-propylene-styrene copolymer (SEPS) was adopted as a styrene elastomer, and the homopolymer of chlorotrifluoroethylene MFR of which is 0.5 g/10 min was adopted, and the mixture of maleic anhydride polyethylene with a styrene elastomer (SEBS rubber) with 10 wt % was adopted as the adhesive resin.

Embodiment 2

The multi-layer tube of the following five-layer structure was produced.

The inner layer 2: straight chain low density polyethylene (100 μm)/the adhesive resin layer 4-1: the adhesive resin (25 μm)/the barrier layer 5: homopolymer of chlorotrifluoroethylene (30 μm)/the adhesive resin layer 4-2: the adhesive resin (25 μm)/the outer layer 3: a styrene elastomer (320 μm)

The same resin as those adopted in the embodiment 1 except for the inner layer was adopted.

Embodiment 3

The multi-layer tube of the following seven-layer structure was produced.

The inner layer 2: a styrene elastomer (100 μm)/the adhesive resin layer 4-1: the adhesive resin (25 μm)/the barrier layer 5: homopolymer of chlorotrifluoroethylene (50 μm)/the adhesive resin layer 4-2: the adhesive resin (25 μm)/the oxygen barrier layer (30 μm)/the adhesive resin layer 4-3: the adhesive resin (25 μm)/the outer layer 3: a styrene elastomer (245 μm)

The same resin as those adopted in the embodiment 1 was adopted except for the fact that a ethylene-vinyl acetate saponified copolymer (EVOH) with ethylene content of 32 mol % was used as the oxygen barrier layer.

Embodiment 4

The multi-layer tube of the following seven-layer structure is produced.

The inner layer 2: straight chain low density polyethylene (100 μm)/the adhesive resin layer 4-1: the adhesive resin (25 μm)/the barrier layer 5: homopolymer of chlorotrifluoroethylene (30 μm)/the adhesive resin layer 4-2: the adhesive resin (25 µm)/the oxygen barrier layer (15 µm)/the adhesive resin layer 4-3: the adhesive resin (25 µm)/the outer layer 3: a styrene elastomer (280 µm)

The same resin as those adopted in the embodiment 3 except for the inner layer was adopted.

Embodiment 5

The multi-layer tube of the following three-layer structure was produced in such a way that the barrier layer was disposed to be the innermost layer.

The barrier layer 5: homopolymer of chlorotrifluoroethylene (20 µm)/the adhesive resin layer 4-2: the adhesive resin (25 µm)/the outer layer 3: a styrene elastomer (455 µm)

The same resin as those adopted in the embodiment 1 except for the fact that the inner layer 2 and the adhesive layer 4-1 were omitted was adopted.

Embodiment 6

The multi-layer tube of the following five-layer structure was produced in such a way that the barrier layer was disposed to be the innermost layer.

The barrier layer 5: homopolymer of chlorotrifluoroethylene (50 µm)/the adhesive resin layer 4-2: the adhesive resin (10 µm)/the oxygen barrier layer (30 µm)/the adhesive resin layer 4-3: the adhesive resin (10 µm)/the outer layer 3: a styrene elastomer (400 µm)

The same resin as those adopted in the embodiment 3 except for the fact that the inner layer 2 and the adhesive layer 4-1 were omitted was adopted.

Comparison Embodiment 1

The multi-layer tube of the following five-layer structure was produced.

The inner layer (100 µm)/the adhesive resin layer (25 µm)/the barrier layer (50 µm)/the adhesive resin layer (25 µm)/the outer layer (300 µm)

The same resin as those used in the embodiment 2 was adopted except for that fact that polyvinylidene fluoride (PVDF) was used as the barrier layer and that straight-chain low density polyethylene (LLDPE) was used as the outer layer. The steam barrier capacity and the kink resistance were both evaluated to be bad.

Comparison Embodiment 2

The multi-layer tube of the following five-layer structure was produced.

The inner layer: a styrene elastomer (100 µm)/the adhesive resin layer (25 µm)/the barrier layer (50 µm)/the adhesive resin layer (25 µm)/the outer layer: a styrene elastomer (300 µm)

The same resin as those used in the embodiment 1 was adopted except for that fact that a styrene elastomer consisting of a styrene-ethylene-butylene-styrene block copolymer was used as the inner and the outer layers. The tensile modulus and the tensile yield strength were measured to be 20 MPa and 12 MPa, respectively. The steam barrier capacity was evaluated to be good, but the kink resistance was evaluated to be bad.

Comparison Embodiment 3

The multi-layer film of the following structure was produced.

The inner layer (100 µm)/the adhesive resin layer (25 µm)/the barrier layer: copolymer of ethylene and chlorotrifluoroethylene (50 µm)/the adhesive resin layer (25 µm)/the outer layer (300 µm)

The same resin as those used in the embodiment 1 was adopted except for that fact that a ethylene-chlorotrifluoroethylene copolymer was used as the barrier layer. The MFR and the tensile modulus of a ethylene-chlorotrifluoroethylene copolymer were measured to be 0.05 g/10 min and 720 MPa, respectively. The steam barrier capacity was evaluated to be acceptable. However, since the multi-layer tube could not be produced by the forming in the co-extrusion manner, the multi-layer film was evaluated instead.

Comparison Embodiment 4

The multi-layer film of the following structure was produced.

The inner layer: fluoro resin (75 µm)/the adhesive resin layer (25 µm)/the outer layer: a styrene elastomer (400 µm)

The same resin as those used in the embodiment 1 was adopted except for that fact that polytetrafluoroethylene (PTFE) was adopted as fluoro resin. The melting point of PTFE was measured to be 330° C., while that of a styrene elastomer was measured to be 132° C. The steam barrier capacity was evaluated to be acceptable. However, since the multi-layer tube could not be produced by the forming in the co-extrusion manner, the multi-layer film was evaluated instead.

We claim:

1. A multi-layer tube comprising
a barrier layer consisting of laminated fluoro resin, and at least one outer layer,
the barrier layer having a thickness no greater than 20% of the average thickness of the multi-layer tube
wherein the fluoro resin constituting the barrier layer consists of a homo polymer of chlorotrifluoroethylene having a surface tension higher than or equal to 30 dyne/cm, a melting point no greater than 220° C., a melt flow rate (MFR) between 0.1 and 10 g/10 min at a temperature of 230° C., and a tensile modulus between 750 and 1500 MPa,
the outer layer consisting of a styrene elastomer having a tensile modulus of between 7 and 40 MPa and a tensile yield strength between 0.5 and 5 MPa,
the barrier layer and the outer layer being integrally laminated with each other by forming the barrier layer and the outer layer in a co-extrusion manner with an adhesive resin being interposed between the barrier layer and the outer layer.

2. The multi-layer tube according to claim 1, wherein said multi-layer tube comprises at least
the barrier layer (A) consisting of a homo polymer of chlorotrifluoroethylene, and
the outer layer (B) consisting of a styrene elastomer having a tensile modulus of between 7 and 40 MPa and a tensile yield strength of between 0.5 and 5 Mpa, and
an oxygen barrier layer (C) interposed between the barrier layer (A) and the outer layer (B),
the barrier layer (A), the outer layer (B) and the oxygen barrier layer (C) being integrally laminated by forming these layers in a co-extrusion manner with an adhesive resin layer being interposed between layer the barrier layer (A) and the oxygen barrier layer (C) and another adhesive resin layer being interposed between the outer layer (B) and the oxygen barrier layer (C).

3. The multi-layer tube according to claim 2, wherein said of both adhesive resin layers consist essentially of a mixture of acid modified polyethylene and styrene elastomer or a mixture of acid modified polyethylene, styrene elastomer and epoxidized olefin resin.

4. The multi-layer tube according to claim 3, wherein said styrene elastomer of said adhesive resin is an SEBS rubber.

5. A multi-layer tube comprising
a barrier layer consisting of laminated fluoro resin, and
at least one outer layer,
the barrier layer having a thickness no greater than 20% of the average thickness of the multi-layer tube,
wherein the fluoro resin constituting the barrier layer consists of a homo polymer of chlorotrifluoroethylene having a surface tension higher than or equal to 30 dyne/cm, a melting point no greater than 220° C., a melt flow rate (MFR) between 0.01 and 10 g/10 min at a temperature of 230° C., and a flexural modulus between 1200 and 1800 MPa,
the outer layer consisting of a styrene elastomer having a tensile modulus of between 7 and 40 MPa and a tensile yield strength between 0.5 and 5 MPa,
the barrier layer and the outer layer being integrally laminated with each other by forming the barrier layer and the outer layer in a co-extrusion manner with an adhesive resin being interposed between the barrier layer and the outer layer.

6. The multi-layer tube according to claim 5, wherein said multi-layer tube comprises at least
the barrier layer (A) consisting of a homo polymer of chlorotrifluoroethylene, and
the outer layer (B) consisting of a styrene elastomer having a tensile modulus of between 7 and 40 MPa and a tensile yield strength of between 0.5 and 5 Mpa, and
an oxygen barrier layer (C) interposed between the barrier layer (A) and the outer layer (B),
the barrier layer (A), the outer layer (B) and the oxygen barrier layer (C) being integrally laminated by forming these layers in a co-extrusion manner with an adhesive resin layer being interposed between the barrier layer (A) and the oxygen barrier layer (C) and another adhesive resin layer being interposed between the outer layer (B) and the oxygen barrier layer (C).

7. The multi-layer tube according to claim 6, wherein of both adhesive resin layers consist of a mixture of acid modified polyethylene and styrene elastomer or a mixture of acid modified polyethylene, styrene elastomer and epoxidized olefin resin.

8. The multi-layer tube according to claim 7, wherein said styrene elastomer of said adhesive resin is an SEBS rubber.

9. A multi-layer tube comprising
a barrier layer consisting of laminated fluoro resin, and
at least one outer layer,
the barrier layer having a thickness no greater than 20% of the average thickness of the multi-layer tube,
wherein the fluoro resin constituting the barrier layer consists of a copolymer of chlorotrifluoroethylene having a surface tension higher than or equal to 30 dyne/cm, a melting point no greater than 220° C., a melt flow rate (MFR) between 0.01 and 10 g/10 min at a temperature of 230° C., and a flexural modulus between 1200 and 1800 MPa
the outer layer consisting of a styrene elastomer having a tensile modulus of between 7 and 40 MPa and a tensile yield strength between 0.5 and 5 MPa,
the barrier layer and the outer layer being integrally laminated with each other by forming the barrier layer and the outer layer in a co-extrusion manner with an adhesive resin being interposed between the barrier layer and the outer layer.

10. The multi-layer tube according to claim 9, wherein said multi-layer tube comprises at least
the barrier layer (A) consisting of a copolymer of chlorotrifluoroethylene,
the outer layer (B) consisting of a styrene elastomer having a tensile modulus of between 7 and 40 MPa and a tensile yield strength of between 0.5 and 5 Mpa, and
an oxygen barrier layer (C) interposed between the barrier layer (A) and the outer layer (B),
the barrier layer (A), the outer layer (B) and the oxygen barrier layer (C) being integrally laminated by forming these layers in a co-extrusion manner with an adhesive resin layer being interposed between the barrier layer (A) and the oxygen barrier layer (C) and another adhesive resin layer being interposed between the outer layer (B) and the oxygen barrier layer (C).

11. The multi-laver tube according to claim 10, wherein of both adhesive resin layers consist of a mixture of acid modified polyethylene and styrene elastomer or a mixture of acid modified polyethylene, styrene elastomer and epoxidized olefin resin.

12. The multi-layer tube according to claim 11, wherein said styrene elastomer of said adhesive resin is an SEBS rubber

* * * * *